United States Patent
Aman (10) Patent No.: US 8,611,723 B2
(45) Date of Patent: Dec. 17, 2013

(54) SYSTEM FOR RELATING SCOREBOARD INFORMATION WITH EVENT VIDEO

(76) Inventor: James Andrew Aman, Telford, PA (US)

( * ) Notice: Subject to any disclaimer, the term of this patent is extended or adjusted under 35 U.S.C. 154(b) by 1469 days.

(21) Appl. No.: 11/899,488

(22) Filed: Sep. 6, 2007

(65) Prior Publication Data

US 2008/0089666 A1 Apr. 17, 2008

Related U.S. Application Data

(60) Provisional application No. 60/842,700, filed on Sep. 6, 2006.

(51) Int. Cl.
H04N 9/80 (2006.01)
H04N 5/77 (2006.01)

(52) U.S. Cl.
USPC ........... 386/248; 386/223; 386/224; 386/239; 386/241

(58) Field of Classification Search
USPC .................................. 386/223–224, 239–262
See application file for complete search history.

(56) References Cited

U.S. PATENT DOCUMENTS

| | | | | |
|---|---|---|---|---|
| 6,038,368 | A * | 3/2000 | Boetje et al. | 386/278 |
| 2003/0030651 | A1* | 2/2003 | Gibbs et al. | 345/619 |
| 2003/0182620 | A1* | 9/2003 | Errico et al. | 715/500.1 |
| 2005/0272496 | A1* | 12/2005 | Reinish et al. | 463/2 |
| 2005/0277466 | A1* | 12/2005 | Lock | 463/30 |
| 2006/0039674 | A1* | 2/2006 | Sonoda et al. | 386/52 |
| 2006/0075454 | A1* | 4/2006 | Jung et al. | 725/135 |

* cited by examiner

Primary Examiner — Hung Dang (57) ABSTRACT

A system for automatically relating the changing information posted on an electronic display $10a$, in regard to some ongoing event, to the recorded information, such as video, captured and corresponding to that same ongoing event. Posted information is remotely detected using master camera $50a$ that is aligned to capture images 12 of electronic display $10a$ during the event. Current images $12c$ are subtracted from base image $12b$ to yield difference image $12fr$ revealing one or more areas of potential electronic display $10a$ changes that are pre-calibrated into cells, such as game clock 12-1, which are further calibrated into characters, such as 12-1-1 for the "tens" digit through 12-1-4 for the "hundredths" digit. Using pattern matching algorithms well understood in the art, all changes to any character and therefore any cell are automatically detected and translated into digital information relatable by time to any recordings of the event, such as a video stream.

12 Claims, 7 Drawing Sheets

Fig. 4a scoreboard calibration step

SYSTEM FOR RELATING SCOREBOARD INFORMATION WITH EVENT VIDEO

RELATED APPLICATIONS

This application claims priority of U.S. provisional application Ser. No. 60/842,700 filed on Sep. 6, 2006.

The present invention is related to International patent application serial number US05/013132, filed on Apr. 18, 2005 entitled Automatic Event Videoing, Tracking and Content Generation System that is pending. The present inventors also incorporate by reference the following:
1. U.S. patent application Ser. No. 10/006,444, filed on Nov. 20, 2001 entitled Optimizations for Live Event, Real-Time, 3-D Object Tracking that is pending both in the U.S. and internationally;
2. U.S. Pat. No. 6,707,487 B1, filed on Feb. 22, 2000 entitled Method for Representing Real-Time Motion, (now pending internationally),
3. U.S. Pat. No. 6,567,116 B1, filed on Nov. 20, 1998 entitled Multiple Object Tracking System (now pending internationally.)

TECHNICAL FIELD

The present invention relates to devices for automatically and remotely determining the information displayed by an electronic sign, especially those used during sporting events. The present invention also relates to methods for using this information to automatically segment video captured of an event about which the electronic sign was reporting, regardless of how the displayed information was determined.

BACKGROUND AND SUMMARY OF THE INVENTION

Within the sports marketplace, and especially at the more elite levels, the ability to review pertinent video sequences from games or training sessions is of high value. Current practices for creating such video breakdowns rely upon a combination of real-time and post-event operator input. Companies such as XOSTech, of Sanford, Fla., provide real-time video capture, edit and display software that has at least a keyboard interface for indicating when important events occur, start and/or end. These events might be the next specific play in football where it is beneficial to know at least when the play began and ended in a time sequence that corresponds to the game video. Such begin-end event time indications may then be used to automatically recall corresponding relevant video. Events may also be instantaneous such as the time of a fumble in football or shot attempt in basketball or ice hockey.

There are several drawbacks with these manually controlled video breakdown systems at least including:
1. Manual operated breakdown of video is tedious and therefore also prone to human error;
2. Operators have limited reflex speed and therefore are limited in their ability to accurately record a real-time event such as the exact end of a period of play with the correct frame in a video stream, which may be of importance when trying to determine if a team scoring attempt was completed within regulation time, and
3. Operators have limited observation skills and typically best respond to only a few real-time events at any given moment, which may be important when they are trying to indicate each time a shot-on-goal has been recorded while they are also trying to record hits, plays, passes, etc.

Hence, what is desirable is a system that automatically determines the exact start and end time of any event that is of importance for later video breakdown and video clip extraction. Some events have minimal duration, such as a shot-on-goal, in which case it is simply important to record when the shot was taken, without a start and end time per se. In any case there are many important events that cannot be determined by automatically reading the venue scoreboard and for this reason the present inventor has already specified inventions for automatically tracking the movement of athletes in a sporting contest and creating an event list correlated to the event video (see Related Applications above.) However, most if not all of the information displayed on the scoreboard may be helpful for at least partially breaking down any and all synchronized game video, especially in youth sporting events where no other viable option exists. Hence, just the ability to breakdown the entire game video into periods is helpful. Furthermore, the ability to jump into periods of video at specific "time-in" and "time-out" sports is also important.

Therefore it is the object of the present invention to provide apparatus and methods for automatically determining the ongoing and real-time character-by-character changes on an electronic display, especially on a game scoreboard being used during a live sporting event. It is still further an object of the present invention not to require any wired or wireless input from the scoreboard or its controlling console but rather to rely solely upon the same scoreboard radiated visible energy used by fans to receive visually presented data. A further object is to provide this ongoing changing character output synchronized to a system counter that itself implies real-time and is itself synchronized to one or more video streams. It is also an object to provide this streaming data in such a way that it can be mixed and compared to other real-time data gathering systems such as a player and game object tracking system so that together their output data may be used to imply important information that may not be otherwise determinable.

Still further objects and advantages of the present invention will become apparent from a consideration of the drawings and ensuing description.

SPECIFICATION

Figure 1:
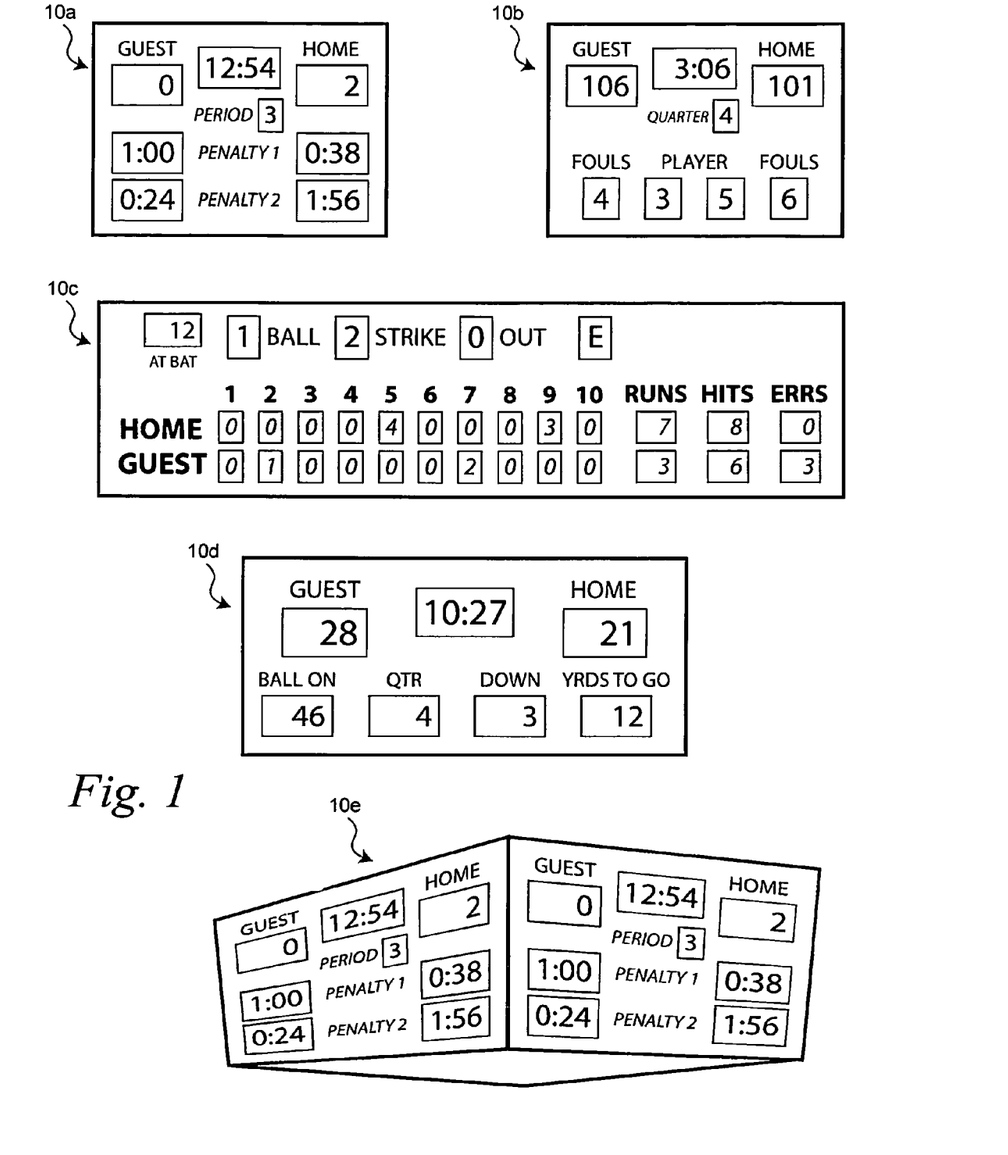
FIG. 1 is a series of perspective images portraying various electronic displays found in the current marketplace as for instance would be used in a sports arena.

Referring to FIG. 1 there is depicted several examples of typical electronic displays/scoreboards as might be used in a sporting arena. There are various examples of single-face scoreboards, such as 10a, 10b, 10c and 10d that are each designed for different types of sports such as respectively: ice hockey, basketball, baseball and football. Such scoreboards may be bought from various companies such as Daktronics of South Dakota. Also shown is a multi-face scoreboard 10e, where each face provides the same visual information. In all cases of scoreboards 10a, 10b, 10c, 10d and 10e, the visual information provided by the scoreboard faces is radiated as visible light energy to the surrounding areas for fans to read and understand. What is desirable is to remotely translate this freely radiated visible energy into corresponding digital information time synchronized to a master cycle counter, that is then also synchronized to video streams being captured of the present sporting event, all of which provides an automatic means of breaking down the captured sports video.

Figure 2A:
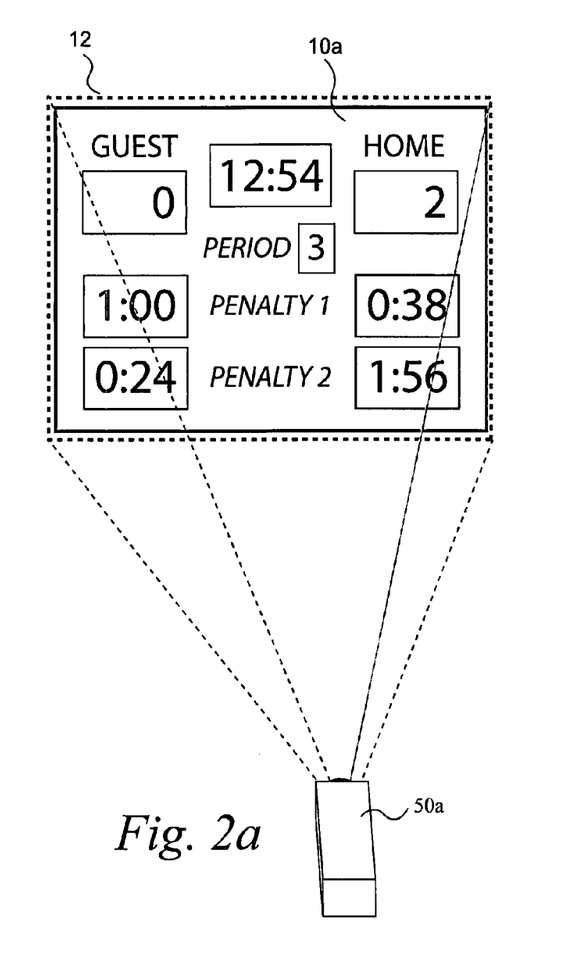
FIG. 2a is a perspective drawing depicting a master scoreboard capture camera in a fixed alignment with an example single face scoreboard.

Referring next to FIG. 2a, there is shown master scoreboard camera 50a that has been placed in some fixed location and calibrated such that its field-of-view 12 tightly overlaps the scoreboard face, e.g. 10a. Camera 50a is then able to capture radiant energy coming from scoreboard face 10a at some frame rate that is preferably twice that of the fastest expected character cycling on the scoreboard, as will be discussed in more detail below with respect to FIG. 6. For example, if the fastest character to be updated on the entire scoreboard face is hundredths of a second, then preferably the master camera 50a runs at 250 fps.

Figure 2B:
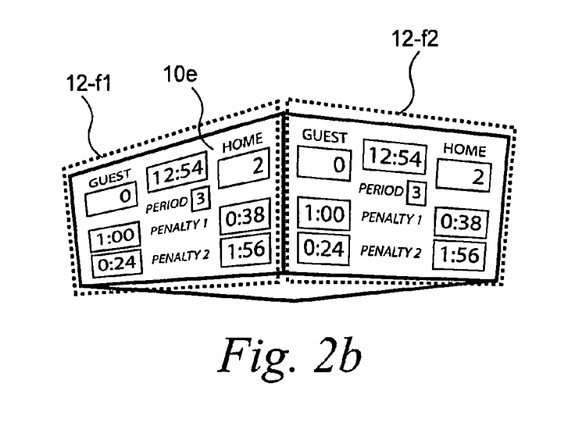
FIG. 2b is a perspective drawing depicting dashed outlines representing the alignment of two scoreboard capture cameras, one master and the other a slave, each in a fixed alignment with two separate faces of a second multi-face scoreboard.

Referring next to FIG. 2b, there is shown the resulting fields-of-view 12-f1 and 12-f2 corresponding to two of the depicted four faces on multi-face scoreboard 10e. Each field-of-view 12-f1 and 12-f2 is captured by its own scoreboard camera (not shown) such as 50a where it is understood that one of the capturing cameras is designated as the master while any and all additional cameras are slaves whose image capture is synchronized to the master as will be understood by those familiar with machine vision systems. For the remainder of the specification related to FIG. 1 through FIG. 7, multi-face scoreboard 10e fields-of-view 12-f1 and 12-f2 are identical in function and purpose to single face scoreboard 10a field-of-view 12, except that their resulting translated radiation to digital information provides redundancy, the value of which is understood by those skilled in the art of real-time data capture, but otherwise not important to the novelty of the present invention.

Figure 3:
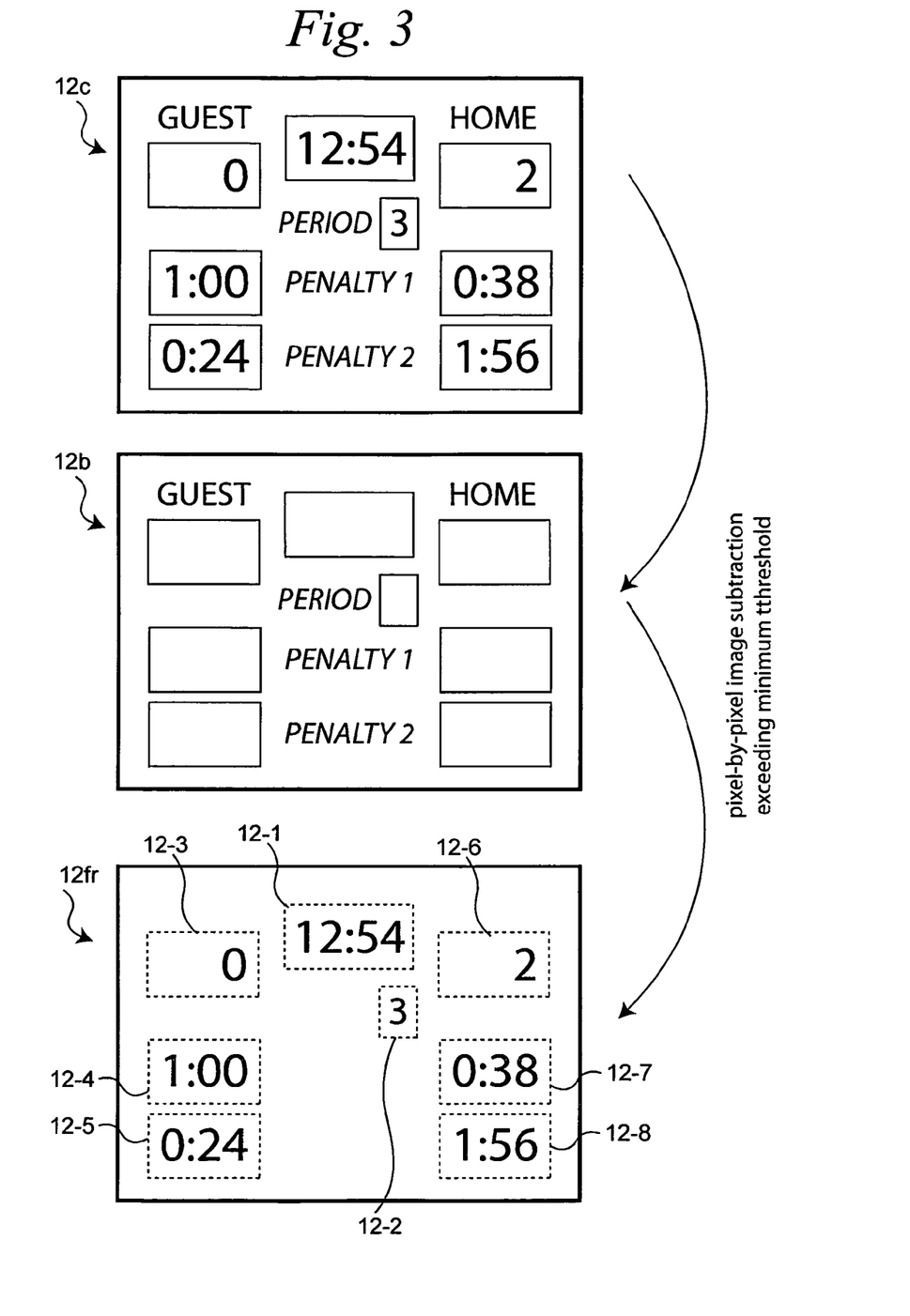
FIG. 3 depicts a current image captured by a scoreboard camera of a turned-on scoreboard face that is subsequently subtracted from a matching turned-off scoreboard face yielding the foreground scoreboard radiation. The foreground scoreboard radiation represents important data and information relating to the game or event in progress. This captured radiation is then segmented into titled cells representing grouped characters on the scoreboard face.

Referring next to FIG. 3, there is shown on top a single current captured image 12c that contains radiated information, i.e. from a turned-on scoreboard. Below this is shown a corresponding background image capture 12b of the same scoreboard face while it is in a turned-off state. Those skilled in the art of machine vision will appreciate that ideally the background image is captured under similar lighting conditions to those that are expected to exist during normal turned-on operation of the scoreboard. In any case, what is necessary is that the difference in pixel value luminance between the turned-on scoreboard image 12c vs. the turned-off scoreboard image 12b, exceed a minimum threshold in order to be considered valid radiated information. This minimum threshold will be understood by those skilled in the art to account for small differences in lighting between the current image 12c and the captured turned-off image 12b. Preferably, the background image 12b is captured with the maximum typical ambient lighting turned on, thereby minimizing the subtracted pixel-by-pixel differences between aligned current image 12c and background image 12b. As will be further appreciated by those skilled in the art of live sporting events, the ambient lighting typically remains on during any live play of athletes for obvious reasons thus providing sufficient similarity between the lighting for current image 12c and pre-captured background image 12b.

Still referring to FIG. 3, and in any case the result of any single image subtraction between a current image 12c and the background image 12b will be the determination of scoreboard foreground radiation 12fr. Using appropriately designed software, as will be understood by those skilled in the are of machine vision, it is possible to segregate any given subset of radiation image 12-fr into image portions, herein referred to as cells such as 12-1, 12-2, 12-3, 12-4, 12-5, 12-6, 12-7 and 12-8. It should therefore be understood that each cell 12-1 through 12-8 represents a unique different area of a scoreboard, such as 10a, and that in each unique area covered by cells 12-1 through 12-8 there may be one or more radiated characters or symbols of information.

Figure 4A:
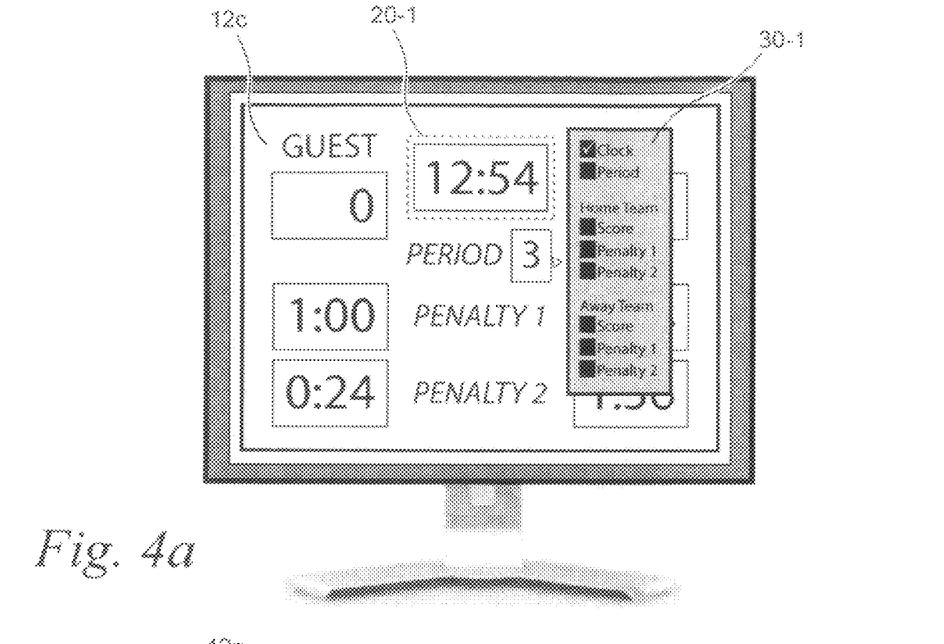
FIG. 4a and FIG. 4b depict the use of calibration software that allows the overlay of bounding boxes around individual scoreboard cells containing a single group of characters. Each bounding box is then selectively associated with an identifying group title.
Figure 4B:
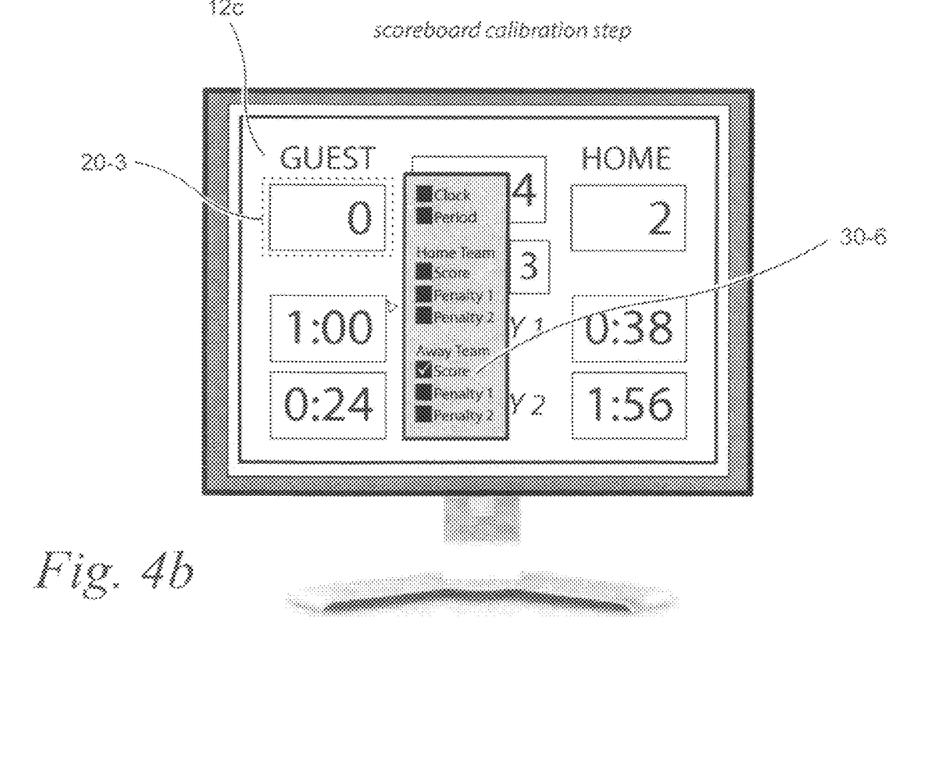

Referring now to FIG. 4a and FIG. 4b, there is depicted an example system calibration screen as might be found in controlling software for the present invention. As will be understood by those skilled in the art of machine vision systems, it is possible to allow an operator to use a marquee (bounding box) to surround the portion of the scoreboard image 12c the might represent a given unique scoreboard area such as 12-1. After aligning such a bounding box to define cell 12-1, the software operator will then preferably pop-up a list of pre-known character group titles for the given scoreboard 10a. This list might include titles such as Clock 30-1 or Away Team Score 30-6. What is important is that all of the areas of the scoreboard 10a be identified with a meaningful title typically, but not necessarily, matching in name the fixed information printed on the face of the scoreboard.

Figure 5A:
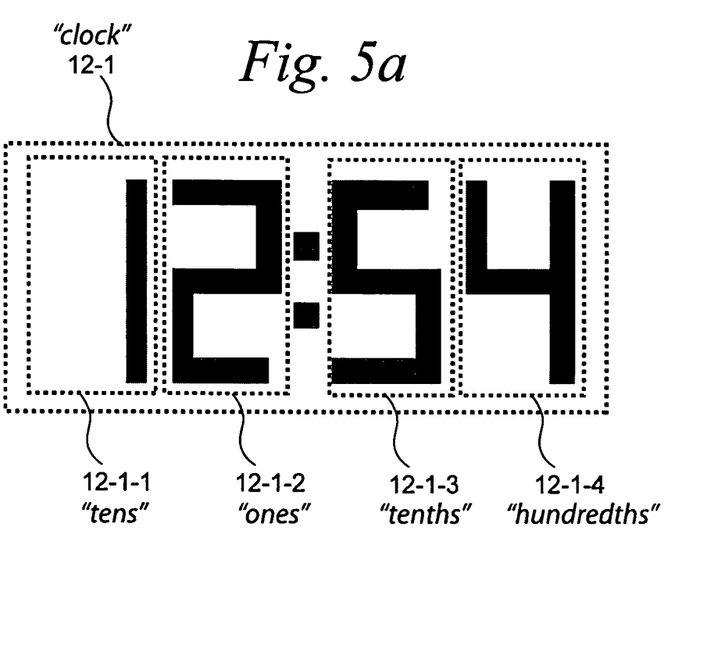
FIG. 5a depicts the further use of calibration software that allows the overlay of bounding boxes around individual characters within a titled group, where each character is typically a letter or number but may be any symbol.

Referring next to FIG. 5a, there is depicted one cell 12-1, e.g. of scoreboard 10a, representing scoreboard character group area 30-1 radiating "Clock" information. Within cell 12-1, as will be understood by those skilled in the art of machine vision, it is further possible to allow the operator to use a marquee (bounding box) to surround each portion of the cell 12-1 representing a unique potential character, such as a letter, number or symbol. Each bounded area within a cell is then individually addressable and associated with a tide similar to the group, for example 12-1-1 covers the "tens" numeral, 12-1-2 covers the "ones" numeral, 12-1-3 covers the "tenths" numeral while 12-1-4 covers the "hundredths" numeral.

Figure 5B:
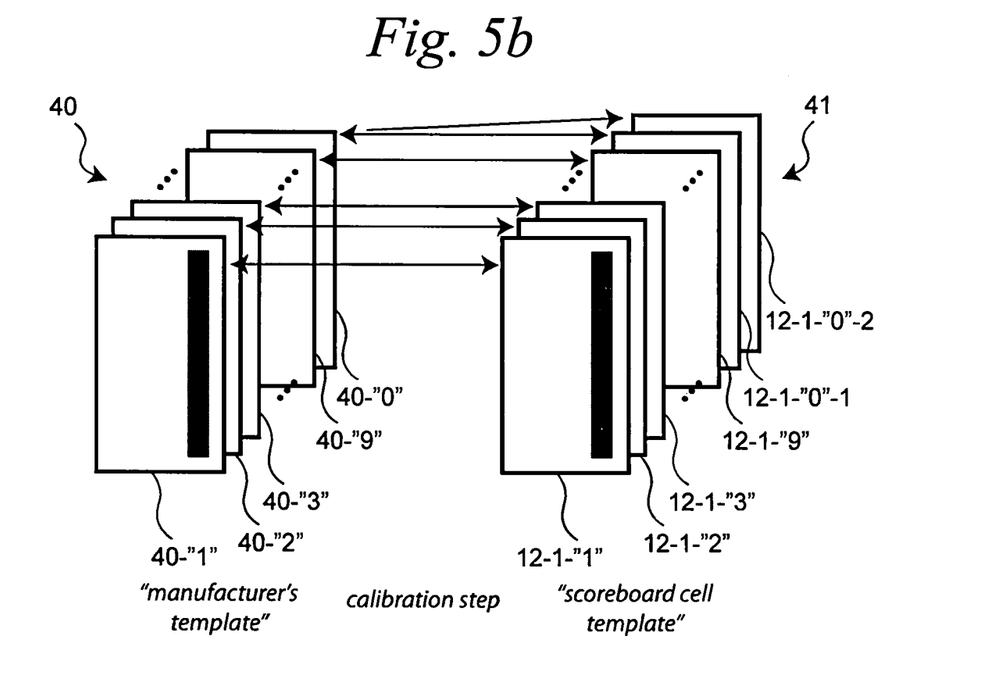
FIG. 5b depicts the use of a manufacturer's template of original character patterns for matching with the captured radiated energy in order to determine its digital equivalent. Also depicted is a custom scoreboard cell template that associates each possible character, within each given cell, as it actually displays (i.e. with defects) on a given scoreboard face with the manufacturer's template thereby confirming the digital meaning of each potentially defective character.

Now referring to FIG. 5b, there is shown that in general with each model of scoreboard 10a, and further with each titled character group within that given scoreboard, such as 12-1 through 12-8, there will be a list of pre-defined possible characters, referred to as the manufacturer's template 40. This template 40 of possible characters thus provides a pattern matching list for translating the captured radiant energy of each given cell character, 12-1-1 through 12-1-4. Note that each given cell character, 12-1-1 through 12-1-4 may share a manufacturer's template 40 or have its own unique scoreboard cell template 41, where this template accounts for scoreboard defects. It should also be noted that the scoreboard template 41 is meant to be established on-site while each scoreboard 10a-master camera 50a combination is being calibrated. During this process, each possible character, such as 40-"1" through 40-"0", or manufacturer's template 40 may be associated with one or more custom cell template 41 characters, such as 12-1-"1" through 12-1-"0". Note that as depicted, some manufacturer character templates such as 40-"0" may have more than one possible cell character template, such as 12-1-"0"-1 and 12-1-"0"-2. As will be understood by those skilled in the art, this approach is establishing two separate custom patterns that may both be recognized as the "0" character (for instance) and neither may exactly match the original master character pattern, 40-"0".

As will be also understood by those familiar with typical sports venues, at any given time radiated data from scoreboard 10a may be not equal to the originally intended radiated information. This situation arises, for instance, when the LED lights typically used to radiate energy spots forming the individual characters malfunctions and no longer emits visible light. In these cases, the captured character image data in cells such as 12-1 through 12-8 may not exactly match any of the patterns included the manufacturer's template 40. What is important is that most often some majority of radiating energy will be visible during a calibration step for every given scoreboard cell character, e.g. 12-1 through 12-8 so that the operator may then correctly associate each original pattern in the manufacturer's template 40, such as 40-"1" through 40-"0", with the most equivalent currently radiating cell character, thus creating for example scoreboard cell template 41, unique to cell 12-1. It will be understood by those skilled in the art that both templates 40 and 41 could be used in subsequent pattern matching algorithms as individual characters such as 12-1-1 through 12-1-4 are recognized in real-time. The advantage of using the customized scoreboard cell template 41 is that it more closely represents actual radiation per any given scoreboard cell character, but it is otherwise not required for the novelty of the present invention.

Figure 6:
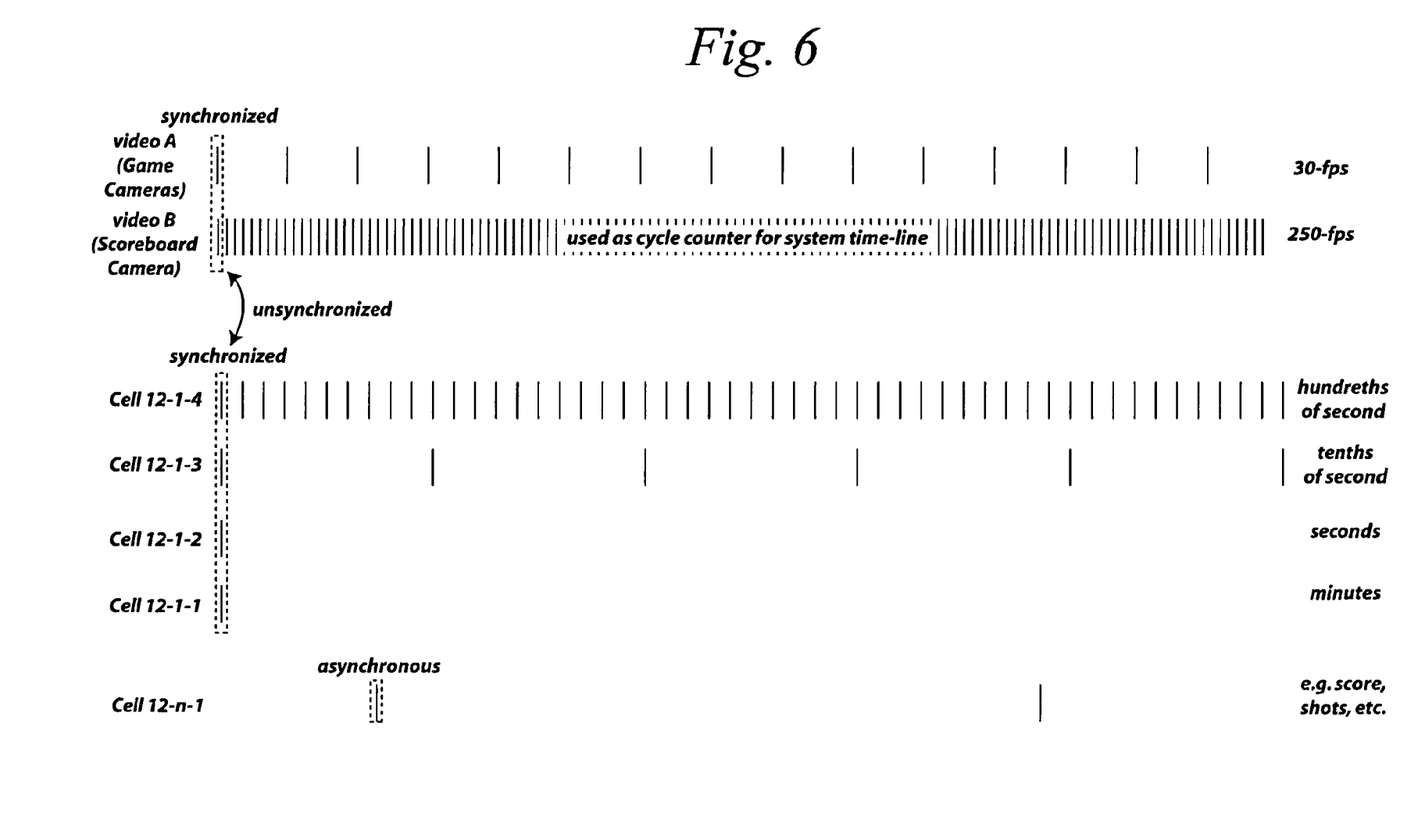
FIG. 6 depicts on top the cycle count of a typical 30 fps video camera that might be used to capture images of a sporting event about which the electronic sign/scoreboard displays real-time information. Below this is cycle count of the master scoreboard camera that is positioned to capture the radiant energy from a face of the scoreboard. Below this is depicted various time lines of both synchronous and asynchronous characters within titled groups that may exist on a typical scoreboard.

Referring next to FIG. 6 there is on top shown the cycle counter representing what might be a typical video camera being used to capture images of the sporting event about which the scoreboard 10a is reporting. It is assumed that more than one video camera may be capturing images simultaneously, for example from different perspectives, and that their image captures are synchronized. FIG. 6 depicts these one or more video cameras running at a typical 30 fps, although some higher rate such as 60 fps, 120 fps or even higher is anticipated. Furthermore, it is also possible that not all video cameras are capturing at the same frame rates and that at least one camera may be capturing at a rate in access of the master scoreboard camera 50a. What is important for the teaching of the present invention is that all of the video cameras capturing the sporting event are synchronized to the master scoreboard camera 50a, that in turn is detecting real-time scoreboard information based solely upon scoreboard 10a radiation.

Still referring to FIG. 6, there is next show the cycle counter of the master (and slave) scoreboard cameras, such as 50a. Preferably, these cameras are running at more than twice the update rate of the fastest updated character on scoreboard 10a. However, for the purposes of the invention, all that is necessary is that the master camera 50a captures images at least as often as the fastest character on scoreboard 10a is expected to change. Next is depicted a set of synchronized characters, 12-1-1 through 12-1-4 of a given scoreboard 10a cell 12-1. In this example these synchronized characters represent the tens, ones, tenths and hundredths column of the game Clock 30-1. An finally there is shown the asynchronous cycles of some cell character 12-$n$-1, that might for instance represent the score, shots taken, or some other intermittently updated information.

Altogether, FIG. 6 shows that every possible character on scoreboard 10a can update at some synchronized or intermittent time that is relatable to the master scoreboard camera 50a, whose preferable highest frame rate then acts as the cycle counter for the system time-line. This system time-line then in turn relates to all video frames captured of the sporting event, thereby providing a means for matching the changes in any character on the face of scoreboard 10a with all video frames nearest in time sequence.

Figure 7:
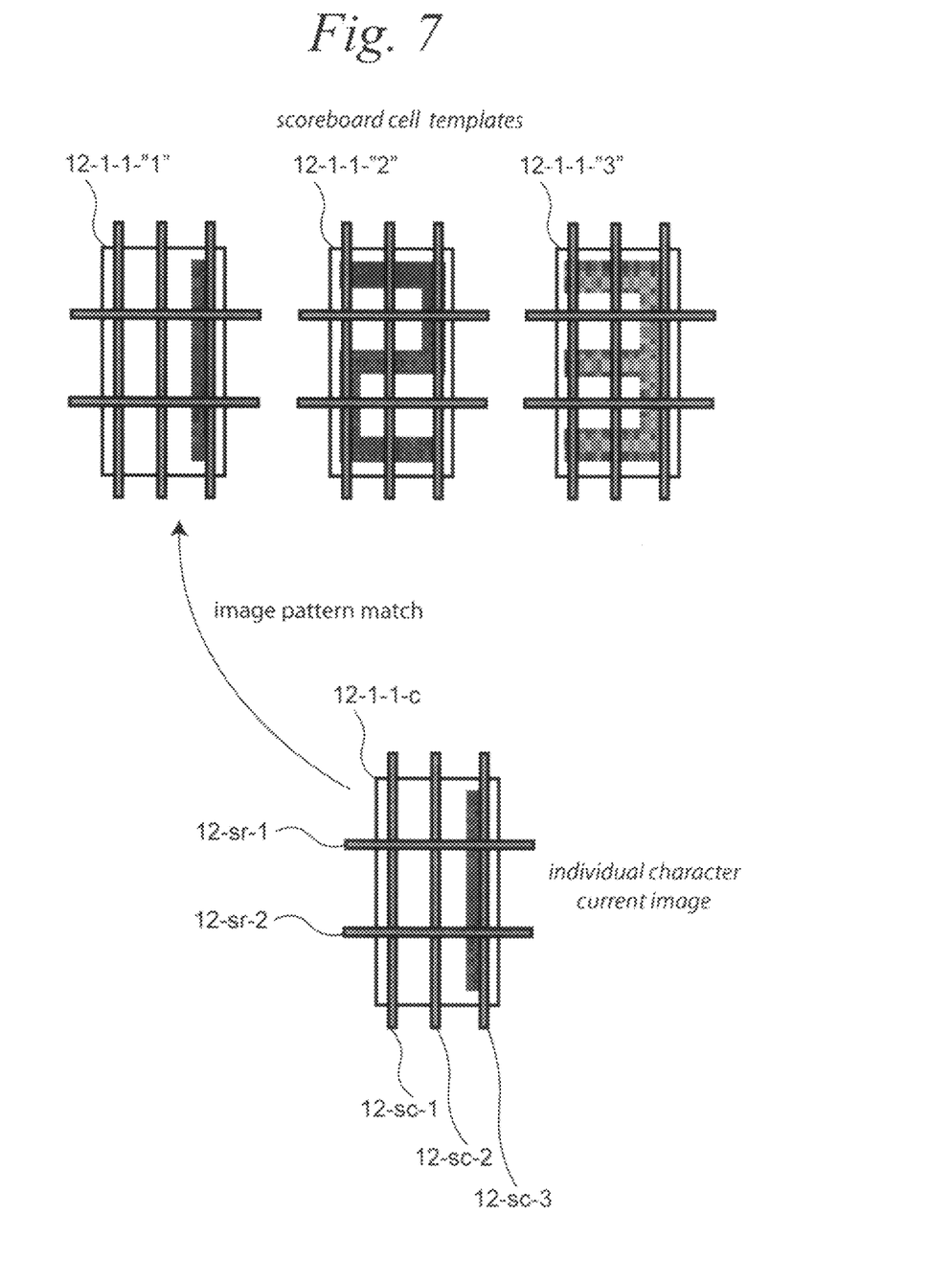
FIG. 7 depicts a suggested pattern matching method for quickly comparing the captured radiant energy from a single character to the scoreboard cell template list uniquely representing that character. The net result of the pattern match serves to translate the captured radiated energy into its digital equivalent detected at a specific cycle count with respect to the master scoreboard camera.

Referring next to FIG. 7, there is shown one possible strategy for quickly comparing the current image of an individual character, e.g. 12-1-1-$c$, with that cell's template 41. It should be noted that the entire cell 12-1 may share the same template 41 or that each character in the cell, such as 12-1-1 may have its own template 41. It will also be understood by those skilled in the art that the template 41 patterns do not need to exactly match the current image of any individual character since many well known pattern matching techniques account for minor and even significant pattern defects. The particular pattern matching strategy employed is not important to the present invention, only that some method is employed that correctly translates each character on the face of the scoreboard 10a into its digital equivalent in real-time. In fact, the characters may be compared against only the original manufacturer's list 40 without any use of the scoreboard cell template 41 without straying from the novelty of the present invention.

Still referring to FIG. 7, it is anticipated that a strategy for quickly processing the pattern match will be used such as comparing only selected search columns, 12-$sc$-1, 12-$sc$-2 and 12-$sc$-3 to the template patterns. Similarly, only selected rows 12-$sr$-1 and 12-$sr$-2 might be compared to save time. Again, what is important is not the exact pattern matching routine, but that each bounded character is captured as least as often as it might be updated and that it is segregated and translated as an individual piece of scoreboard 10a information correctly associated with a meaningful information category, such as Clock 30-1 or Away Team Score 30-6. In fact, the present inventor anticipates that standard Optical Character Recognition (OCR) techniques might be used rather than simple pattern matching, as will be understood by those skilled in the art.

For the operation of the present invention, the present inventor anticipates that at least one camera, the master scoreboard camera 50*a*, will be fixed in a position such that it is able to constantly view one face of the venue scoreboard 10*a*. It is anticipated that many venues will have more than one scoreboard and that many scoreboards will have more than one face. As previously mentioned, it may be very beneficial to set up one or more additional slave scoreboard cameras, similar to matter 50*a* but taking its external image capture trigger from 50*a*, where each slave captures a different face on the same or different scoreboard. It is even anticipated that many sporting venues, especially at the professional arenas may have more than one scoreboard with different layouts and therefore different information. What is important is that preferably one scoreboard camera act as the master 50*a* and that it be aligned to a face on a scoreboard 10*a* that contains the one character or characters that exhibit the fastest potential refresh rate. Most often, it is expected that his will be the least significant digit, e.g. 12-1-4 the "hundredths," of the game Clock 30-1 on scoreboard 10*a*.

Once this master camera 50*a* is set up, its position is expected to remain fixed along with that of the scoreboard 10*a* itself. Once these positions are fixed, it is then possible to perform the calibration steps. First, it is preferable that all of the venue lights are turned on and the scoreboard 10*a* is turned off, at which time master camera 10*a* should capture at least one image 12*a* of a scoreboard 10*a* face. Once captured, appropriate calibration software will allow an operator to draw bounding boxes over each group of related characters, such as 12-1 through 12-8. After bounding each group into these cells 12-1 through 12-8, the operator then selects from a list, or keys into a data field, the title of that group of cells, such as "Clock" 30-1 corresponding to cell 12-1. As will be appreciated by those skilled in the art of software design, other more convenient ways may be thought of to segregate the scoreboard image into individual units of display information. What is important is that this step is performed at least once during calibration so that the system can know which portion of each current master camera image 12 should be analyzed to find each category of display information. Note that those skilled in the art of machine vision will understand that "portion" in this case easy translates to any area of contiguous image pixels within current image 12.

After the operator defines the image 12 area associated with a specific piece of scoreboard 10*a* information, they will continue to break this area, or cell, such as 12-1 through 12-8 into its individual characters. For example, 12-1 (the Clock 30-1) might then be broken into four characters 12-1-1, 12-1-2, 12-1-3 and 12-1-4, namely "tens," "ones," "tenths" and "hundredths." In this case what is important is that after segregating the scoreboard into individual cells 12-1 through 12-8 containing distinct pieces of information, e.g. 30-1 or 30-6, each cell is further divided into its one or more individual characters, such as 12-1-1 through 12-1-4. The next step for the operator is to at least associate each character 12-1-1 through 12-1-4 in each cell such as 12-1 through 12-8 with at least one appropriate master template 40. It is then understood that at any time, each character such as 12-1-1 may take on any pattern found in the associated manufacturer's template 40.

At this point the operator may optionally choose to create individual scoreboard cell templates 41 that are associated with a given cell or even a single character in a cell. It is anticipated that this might be done if the scoreboard is defective enough that the patterns provided by the manufacturer's template are insufficient. In practice, the present inventor does not prefer this step as it is anticipated that a single manufacturer's template will be sufficient, even if defects occur on various characters. Furthermore it is anticipated that the venue might rather prefer to have the scoreboard defect corrected as this is the most prudent action.

However, if an override scoreboard cell template 41 is desired, then the system's software will allow the operator to capture multiple images of each character on the scoreboard 10*a* as they use the scoreboard 10*a*'s controls to individually cycle each possible character through each of its possible values. After this cycling has been completed, the systems software will have a created a unique cell template 41 for any one or more characters that may then be related back to the manufacturer's template. In any case, what is important is that for every character on the scoreboard 10*a*, there is a calibrated image pattern that matches any possible displayed character in some template 40 or 41.

One important benefit of using the scoreboard cell template 41 over the manufacturer's template 40 is that this template is inherently created after the master camera 50*a* is fixed and aligned with the scoreboard 10*a*. Hence, each character image in template 41 is more easily registered, pixel-by-pixel, to the appropriate pixels in the captured image 12. However, as will be understood by those skilled in the art this is not necessary as registration of the capture individual cell characters such as 12-1-1 through 12-1-4 to the manufacturer's list of character images may either be accomplished dynamically as images are parsed or once during calibration using techniques understood by those skilled in the art of machine vision.

After the master camera 50*a*, and therefore any of its current images 12 have been successfully calibrated to the scoreboard 10*a*, on a cell-by-cell, character-by-character basis, the system is ready for use.

During normal operation, it is assumed that some sporting event is set to transpire for which two important requirements exist. First, the sporting event is to be videoed by at least one camera and second the scoreboard is to be operated to display pertinent real-time game information. This being the case, prior to the start of the event the master scoreboard camera 50*a* will begin to take images 12 and its cycle counter will be initiated preferably at count equals 1. Each image 12 will be dynamically broken first into titled cells such as 12-1 and then into individual characters such as 12-1-1 through 12-1-4. For each cycle of the master camera 50*a*, each current character image such as 12-1-1-*c* will be compared to an appropriate template, such as manufacturer's template 40 or cell template 41. After determining the currently displayed character, it will be compared by the system to the character detected in the previous master camera 50*a* cycle. If the character such as 12-1-1 is determined to have changed, then the system will output data with at least the following information: scoreboard camera number, scoreboard cell title, all scoreboard cell characters in an appropriate sequence as well as the master camera cycle count.

Hence, the system will continuously output data during each and every master cycle count relating to any titled cell such as 12-1 through 12-8 wherein at least one of its characters such as 12-1-1 through 12-1-4 has changed. What is additionally important to note is that the output data is in digital form and hence a pattern of visible light forming the Clock 30-1 time, such as "10:13" is now translated into the digital numbers of "tens"=1, "ones"=0, "tenths"=1 and "hundredths"=3. This translation is of utmost important to the purpose of the present invention.

As will be appreciated by those skilled in the art of software and especially data structures, other data output structures are possible without straying from the specifications intent. For instance, rather than outputting the entire Clock 30-1 time, e.g. "10:13", the data might simply include "hundredths"=3, with some scoreboard cell character ID code uniquely identifying that particular character, e.g. 12-1-4. While such approaches reduce the output data stream they also tend to complicate the data's subsequent interpretation. Therefore, what is important is that the system has determined what every character on the scoreboard is displaying at every count of the master cycle. This information may then be used to determine game breakdown information when it is related via the master cycle counter to the synchronized video frames.

For example, as each minute, second, tenth and hundredth of a second are ticked off the scoreboard clock in a sporting event, the clock change may be directly correlated to each captured image of each on or more captured video streams. What is important to understand is that the master camera 50a is being used to automatically update a video timeline that may then be used to automatically recall video from the captured video streams. In this case, the scoreboard information such as the game period, the current score, the current shot counters and even when game time is started or stopped can all be automatically placed into this scoreboard/video shared timeline. It can easily be seen that at the very least such data allow video clips to easily be recalled based upon this automatically updated time line information. For instance, end users could ask for all video pertaining to the last 10 seconds of period 3.

What may not be as obvious to the reader but is also important to the teachings of the present invention is that the continuous correlation of changing scoreboard characters in a synchronized cell such as 12-1 representing Clock 30-1, with the master camera cycle counter provides a basis for important implied information. For instance, since the master camera 50a will continue to video for then entire duration of the game, whether or not game time is "in" or "out," its cycle counter can be compared to the changing clock characters, e.g. 12-1-1 through 12-1-4 in order to imply that time is "in" or "out." Hence, and for example, the hundredths character 12-1-4 of the clock 30-1 cell 12-1 should change every $^{250}/_{100}$=2.5 master cycle counts. Upon looking at the data stream output from the system it is possible to detect that the hundredths character 12-1-4 is either continuing this pace or not. As soon as there is a change in state, i.e. from "not changing" to "changing-on-pace" or vice-versa from "changing-on-pace" to "not changing," a different type of implied event can be marked on the video timeline, namely "time in" and "time out." This is just one example of using not just the detected scoreboard output but also the synchronized master cycle counter to determine important information.

It is also anticipated that that any given set of scoreboard characters, again such 12-1-1 through 12-1-4 may have a normal sequencing direction. It is possible that these characters at some point would either start or stop in normal sequence as just described or even reverse direction or jump to a new combination. This also become important information especially when combined with the ongoing master camera cycle and all previously outputted scoreboard data. For instance, very often the game clock is first stopped, which may be detected as a "time-out," after which it is then reset to a new time. This jump (typically backwards) can be implied by reading the stream of characters 12-1-1 through 12-1-4 and appropriate video time line entries can be made. Furthermore, it may often be the case that time is first stopped, then run off the clock and stopped again. In this case, it is important to know that when the time characters are restarted (but in this case only to run off time) that the game action has not also commenced. The present inventor has already taught in the prior related applications how to track the movement of all players and the game object. It is anticipated that by looking at this movement concurrently with all "time-in" points any such clock resetting could be automatically determined, which is of great help for the purposes of subsequent video breakdown.

Here what is important is that the present invention teaches the gathering of any and all changing character data on from the scoreboard where the characters are appropriately grouped and titled as well as synchronized to a master cycle counter that itself is synchronized to the game video via a time line. It is further important that there is available a history of each changing character along with pre-knowledge of that characters normal change rate such as synchronous to tens of minutes, minutes, tenths or even hundredths of a second so that if this update rate ceases this may imply important data. Also, it is important that each character have a normal changing character sequence that can easily be embodied in the master template 40 such that any change in the normal sequence of characters can also imply important data. For instance, all of the clock characters such as 12-1-1 through 12-1-4 would be expected to cycle from 0, to 1, to 2, to 3, etc up to 9 and then back to 0. If this sequence is broken the master cycle count and therefore time of its break hold valuable implied information.

And finally, along with the continuous automatic output of changing scoreboard characters, the combination of this with other data that might for instance come from a player and game object tracking system, will yield additional important information. In part and in total this information would be helpful for determining what events are actually happening during the game and should be marked on the video time line. Therefore, while the teachings of the present invention have value at various levels of direct and implied output interpretation, they also have additional value when combined with other detecting systems such as but not limited to those taught by the present inventor. For instance, other inventors have taught other methods for tracking player and game object movements, such as by using active beacons or IR transmitters. In any case, the present invention teaches the novel reading of real-time scoreboard information to be matched, mixed, interpreted and other wise used to dynamically and automatically update a time line that is further synchronized to one or more game video streams.

CONCLUSION, RAMIFICATIONS AND SCOPE
OF THE INVENTION

As will be appreciated by those familiar with current practices for breaking down sports video, the game scoreboard holds important changing data that would be desirable to know on a video frame-by-frame, moment-by-moment basis. The present invention teaches a novel way of determining this information directly from a scoreboard, such as 10a through 10e, without needing to be interfaced to that scoreboard. This is an important benefit since the video capture of the sporting event is often done by a system that is not created by the manufacturer of the scoreboard, and hence an interface to the scoreboard's changing data may not be feasible. The present inventor has submitted prior patent applications, specifically international patent application serial number US05/013132, filed on Apr. 18, 2005 entitled Automatic Event Videoing, Tracking and Content Generation System that is pending, that discusses obtaining this same scoreboard information directly from the scoreboard console, thus requiring detail knowledge of the consoles electronic output. However, where this is not possible or convenient, the present application teaches a simple method for gathering real-time scoreboard information for the similar general purposes of Automatic Event Videoing, Tracking and Content Generation, as well as the specific purpose of automatic sports video segmentation.

While the above description contains many details, these should not be construed as limitations on the scope of the invention, but rather as an exemplification of preferred embodiments thereof. Many aspects of the system's functionality are beneficial by themselves without other aspects being present as will be appreciated by those skilled in the art. Furthermore, all of the novel combinations of components taught have anticipated application beyond that of the reading the scoreboard at a live sporting event. Examples of other applications include but are not limited to reading information displays at conference halls, constructions sites, theaters, etc. and basically at least any location where signage would be used in conjunction with video.

From the foregoing detailed description of the present invention, it will be apparent that the invention has a number of advantages, some of which have been described above and others that are inherent in the invention. Also, it will be apparent that modifications can be made to the present invention without departing from the teachings of the invention. Accordingly, the scope of the invention is only to be limited as necessitated by the accompanying claims.

What is claimed is:

1. A system for automatically time segmenting recorded event video using information received directly from an electronic display system, comprising:
   one or more first cameras for recording event video where the event video is stored in a video data structure relatable by time;
   electronic means for simultaneously and continuously receiving in real-time event information directly from an electronic display system that is posting information relevant to the event, and
   processing means for processing the received event information in real-time in order to detect the time at which each datum of event information changes, for storing each datum and the time the datum changed in a data structure relatable by time to the video data structure in order to divide the event video into time segments so that the event video is retrievable based upon event datum changes.

2. The system of claim 1 where the electronic means for receiving information from an electronic display system is a second camera capturing images of the display, and where the images are then parsed by a computing means to determine both the times of change for each particular datum of information along with each datum's new value.

3. The system of claim 2 where the second camera captures images of the electronic display at a different frame rate from the first cameras capturing images of the event.

4. The system of claim 1 where the event is a sporting event and the electronic display is a scoreboard.

5. The system of claim 4 where the event information received from the scoreboard includes any one of (i) game divisions including game period, (ii) game time within game division, (iii) game score data, or (iv) game penalty data.

6. The system of claim 1 where additional object tracking information is obtained in accordance with the event for combination with the event information and where the event video is further retrievable in time segments based upon the combination of object tracking and event information.

7. A method for automatically time segmenting recorded event video using event information received directly from an electronic display system, comprising the steps of:
   using one or more first cameras for recording event video where the event video is stored in a video data structure relatable by time;
   simultaneously and continuously receiving in real-time event information directly from an electronic display system used at the event to post one or more datum of event information;
   processing the received event information in real-time in order to detect the time at which each datum of event information changes, and
   storing each datum and the time the datum changed in a data structure relatable by time to the video data structure in order to divide the event video into time segments so that the event video is retrievable based upon event datum changes.

8. The method of claim 7 where a second camera is used for receiving event information from the electronic display system as video images captured of the electronic display that are parsed by a computing means to determine both the times of change for each particular datum of event information along with each datum's new value.

9. The method of claim 8 where the second camera captures images of the electronic display at a different frame rate from the first cameras capturing images of the event.

10. The method of claim 7 where the event is a sporting event and the electronic display is a scoreboard.

11. The method of claim 10 where the event information received from the scoreboard includes any one of (i) game divisions including game period, (ii) game time within game division, (iii) game score data, or (iv) game penalty data.

12. The method of claim 7 comprising a further step of obtaining object tracking information in accordance with the event for storage in a data structure relatable by time, where the event video is then retrievable in time segments corresponding to the combination of the object tracking information and the times of change and values of the event information.

* * * * *